United States Patent Office 3,456,377
Patented July 22, 1969

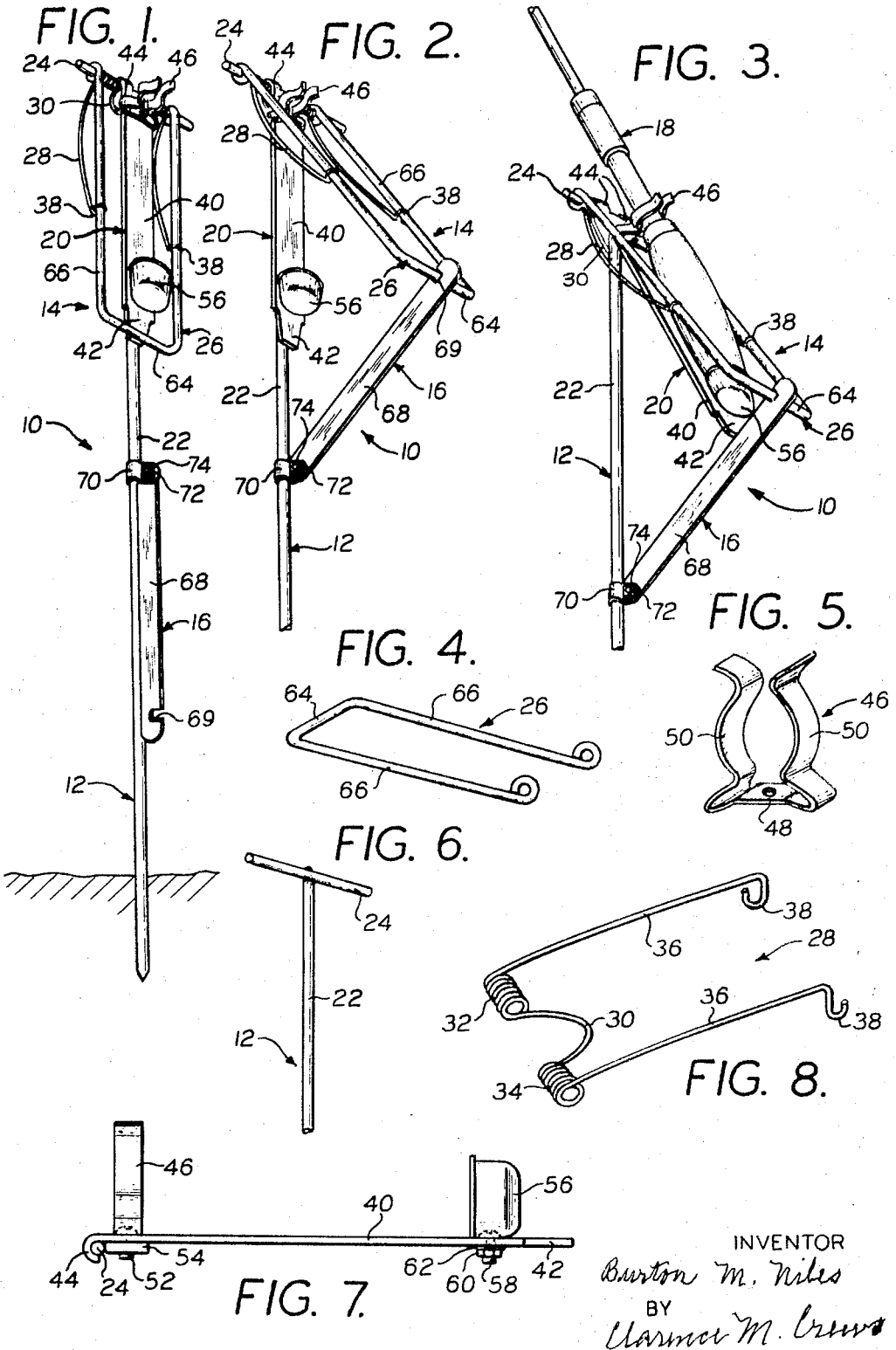

3,456,377
FISHING POLE MOUNT
Burton M. Niles, 841 Waters Creek Road, P.O. Box 1296, Grants Pass, Oreg. 97526
Filed Oct. 10, 1967, Ser. No. 674,300
Int. Cl. A01k 97/10
U.S. Cl. 43—15        5 Claims

ABSTRACT OF THE DISCLOSURE

A novel fishing pole mount is provided for improving the catch of large fish or small fish by eliminating errors frequently committed by novices and not infrequently committed by fishermen of long experience. The mount includes a pole carrier and a trigger controlled, spring operated striker, whereby the pole will be instantaneously snapped, with measured force, to hook the fish in response to a tug on the fishing line.

When trolling, especially for fish of the larger species, it is important to cushion the initial shock when the fish takes the bait. In this situation the trigger is not set, but the spring mechanism is availed of to limit the strain and thereby avoid breaking of the line.

---

This invention relates to a novel mount for fishing poles, whereby the catch may be improved through the elimination of errors attributable to inattention, faulty judgment and/or faulty execution of the fisherman.

To this end it is a feature that the novel mount is made to include a stationary support, a spring actuated striker which may be cocked and retained in place by a trigger or detent, and a movable pole carrier engageable with the trigger substantially in advance of the striker, which, in response to a tug upon the line, serves to trip the trigger, thereby freeing the striker, and causing the striker to swing forward at increasing velocity, percussively to engage the carrier, and to cause the carrier to jerk the pole and line, and to hook the fish without preliminary warning.

It is a feature that the mechanism acts mechanically, in a prompt and uniform manner, never being caught half asleep, tipsy, or in an over-excited state, and never being guilty of a clumpsy mismanagement of the line.

It is a further feature that although the striker acts sharply and suddenly enough generally to assure the hooking of the fish, the force applied is a mechanically limited and measured force, not generally sufficient to tear the hook free, or to break the line.

If the fisherman is trolling, especially for fish of the larger species, there may be a good likelihood that the line will be broken unless something is done to cushion the more violent tugs upon the line. Where this danger is to be expected the present mount can be used to advantage in an uncocked condition. The uncocked striker simply interposes a yieldable, measured spring resistance between the fixed support of the mount and the line, cushioning the shock and limiting the tension upon the line to the force which can be transmitted through the spring.

Other objects and advantages will hereinafter appear.

In the drawing forming part of this specification,

FIGURE 1 is a perspective view from the left rear of a practical and advantageous form of mount illustrative of the invention, with the striker in an uncocked position, and no pole in place;

FIGURE 2 is a view generally similar to FIGURE 1, with the striker cocked but still with no pole supported in the carrier;

FIGURE 3 is a view similar to FIGURES 1 and 2, but showing the striker in a cocked condition, and the pole in place;

FIGURE 4 is a detail, perspective view of the striker or bail;

FIGURE 5 is a detail view of the pole clip;

FIGURE 6 is a view in rear elevation of the support and pivot pin;

FIGURE 7 is a view in side elevation of the carrier assembly in association with the pivot pin; and FIGURE 8 is a perspective view of the spring with the front side of the spring nearer the observer.

The mount 10 will be first described as it appears in FIGURE 3, with a support 12 set firmly into the ground, a spring-actuated striker 14 held in cocked position by a detent or trigger 16, and a fishing pole 18 supported in a normal fishing position in a carrier 20, which carrier serves as a tripper for trigger 16. While there is nothing critical about any dimensions that may be referred to herein, preferred dimensions will be mentioned at times for affording a precise and realistic understanding of the particular mount chosen for illustrative disclosure herein.

The support 12, as shown, comprises a rigid stem or staff 22 of three-eighths inch diameter steel rod thirty inches long and pointed at the bottom for easy penetration into the ground. A fulcrum member in the form of a pivot pin 24, of one-quarter inch diameter and four inches long, extends at right angles to the staff, being welded midway of its length to the rear side of the upper end of the staff.

The pivot pin serves as a pivotal support for the spring actuator 14, including both a striker or bail 26 and an actuating spring 28 therefor, and as a pivotal support for the pole carrier 20. The bail or striker 26 is disposed between the staff 22 and the spring ends, being constantly urged toward the staff by the spring.

The first thing put onto the pivot pin 24 is the spring 28. The spring is composed of spring wire of a little more than one-sixteenth inch in diameter. It consists of a single length of wire and includes a central loop 30 which bears against the forward face of the staff, right and left hand wound helical coils 32 and 34, and substantially parallel arm portions 36 which terminate in hooks 38, which hooks are later caught around the rear sides of the striker arms, and constantly urge the striker forward toward the stem 22. The coils have an inside diameter slightly larger than the diameter of the pivot pin 24, so that there will never be any binding on the pin. The coils 32 and 34 are spaced substantially from one another, by about one and one-quarter inches, and since the carrier 20 has not yet been applied when the spring is put in place, it is a simple matter to slip one of the coils, say 32, onto the appropriate end of the pivot pin and into contact with the stem 22. The coil 34 is then pulled to extend the space between coils, through distortion of the loop 30, far enough so the coil 34 can be slipped onto the opposite end of the pivot pin. With release of tension, the loop 30 returns to its normal dimensions, and the coil 34 is drawn well onto the pin 24. The spring is self-retained on the pivot pin but is readily removable therefrom.

Most conveniently, the carrier 20 is next put into place on the pivot pin 24. The carrier comprises a flat, rigid metallic plate 40, preferably of steel, which measures one-eighth inch thick, one inch wide and nine inches long. The upper end of the plate 40 is formed with a tapering notch which has a minimum width sufficient to clear the diameter of the stem 22 and a depth of more than three-quarters inch (the notch being desirably complementary to the tongue 42 which appears at the lower end of the plate 40). The notch leaves two spaced, tapered ears or prongs 44. These prongs are bent into semi-circular shape, with inner diameters such that the ears can be readily applied over the pivot pin and will fit it snugly but without binding.

After the carrier plate 40 has been put into place, a fishing pole gripping clip 46 is applied to the rear face of the upper end of the plate 40. The clip is generally U-shaped but is formed with a bowed base 48 and with curved arms 50. The clip base 48 engages the plate 40 at the ends of the base, but bellies away from the plate between the base ends. A headed screw 52 has its shank passed from the rear to the front through holes formed in the clip base and in the carrier plate 40, and threaded into a retaining nut 54. The screw can be adjusted to flatten out the clip base more or less as desired, thereby to adjust the effective width of the clip and the pressure exerted by the clip arms 50 upon the fishing pole.

The location of the hole in the plate 40 and the size of the nut 54 are so chosen and coordinated that a side of the nut bears lightly against the pivot pin 24, keeping the pivot pin snugly confined within the bent ears 44. Engagement of a flat side of the nut 54 with the pin 24 holds the nut against rotation, so that the screw can be tightened or loosened as desired by means of a screwdriver alone.

A cup 56, adapted substantially to fit the butt of the fishing pole with which the mount is to be used, is secured to the back face of the lower end of the carrier plate 40 in line with the clip 46. The cup is attached to the plate by means of a headed screw 58 and a nut 60. A lock washer 62 may be interposed between the forward face of the plate 36 and the nut 60. Cups of various sizes may be had for selective use, the substitution of one cup for another being a very simple matter.

The bail or striker 26 is composed of a rod or wire of about three-sixteenths inch diameter. It is bent to provide a crosspiece 64 which extends across the rear face of the lower end of the carrier plate 40, and parallel arms 66 which are curled at their upper ends to wrap around the pivot pin 24. Although the bail is of fairly rigid construction, it is a simple matter to slip the curled end of one arm 66 onto an end of the pivot pin 24 and then, with a moderate spreading of the bent arms, to slip the other arm onto the opposite end of the pivot pin 24. The hooked ends of the spring arms 36 are then put under stress and hooked around the bail arms. As previously noted, the bail is constantly urged toward the stem by the spring. The bail is self-retained on the pivot pin but is readily removable therefrom. The spring is self-retained in operative association with the bail but is readily detachable therefrom.

The trigger 16 consists essentially of a detent arm 68 having a notch 69 near its outer end, and a clamping bracket 70 upon which the detent arm 68 is mounted. The bracket fits around the stem 22 and terminates in parallel ears. The ears are drawn into parallel relation by a screw 72 and a nut 74. The screw 72 forms a pivotal support for the notched detent arm 68. The screw and nut are threaded together tightly enough to clamp the bracket firmly in place on the stem, but not tightly enough to bind the detent arm or to impede turning of the arm.

When the described mount is to utilize the automatic striker feature for hooking a fish, it may be set up as shown in FIGURE 2 with the lower end of the rod carrier disposed a substantial distance in front of the striker. The stem 12 is thrust deeply and firmly into the ground, and the detent or trigger 16 is set, by the insertion in the notch 69 thereof of the transverse member 64 of the bail. This holds the bail in a rearwardly swung position at a substantial angle to the stem (about forty degrees, as shown). This leaves the pole carrier 20 free to move between the bail and the stem. The stem is set in the ground at an angle so chosen with reference to the length, weight and balance of the pole that the lower end of the carrier plate tongue 42 will bear slightly against the upper face of the detent or trigger arm 68, but not with sufficient force to trigger the bail. As shown in FIG. 3, the lower end of the pole carrier is spaced from the striker, being located a substantial distance in front of the striker. When, now, a fish exerts even a light pull upon the fishing line, the lower end of the pole is swung rearward, triggering the bail. This causes the bail to swing forward suddenly and sharply, then to strike the carrier percussively, and to swing the carrier and the lower end of the pole forward with it. The upper end of the pole is thus pulled lightly but abruptly and extensively to the rear, causing the fish to be hooked.

If the quarry is a fish of a large, strong species, likely to strain the line, the mount may advantageously be set up without cocking the trigger, as shown in FIGURE 1. In this setting the carrier is held pressed against the stem by the spring-actuated bail. The spring may yield when a predetermined force is exceeded, cushioning the impact and limiting the tension on the line. Here again the angle at which the mount is set can be important, because the maximum tension to which the line may be subjected by a spring of given strength will be increased as an acute angle made by the taut line with the pole is diminished, or an obtuse angle made by the taut line with the pole is increased.

In either method of use the pole is first used for casting in the conventional manner, any slack is reeled in, and the pole is then set in the carrier. The striker may then be cocked or not, as desired. Once the fish has been hooked, the pole may be detached from the mount, if desired, and the fish may be landed in the conventional way.

The fact should not be overlooked that the parts of the mount have been so chosen and adapted for cooperative assembly with one another that the assembly can be effected with very little labor cost, and in a dependable manner. The parts are very sturdy and durable, but if one does fail, the construction is so simple that replacements can be made by most individuals without the necessity of calling upon professional help.

I have described what I believe to be the best embodiments of my invention. I do not wish, however, to be confined to the embodiments shown.

I claim:
1. A mount for a line-carrying fishing pole comprising, in combination,
  (a) a rigid support adapted to be firmly anchored in fixed position,
  (b) a fulcrum member fixed on the support and having a substantially horizontally disposed axis,
  (c) a depending pole carrier pivotally supported by the fulcrum member to the rear of the support and including pole gripping and supporting means,
  (d) a striker pivotally mounted on the support and extending to the rear thereof for swinging movement toward and from the support, and having a portion separably engageable with the carrier from the rear thereof in an area remote from the fulcrum axis,
  (e) a spring, continually maintained under strain by engagement with the support, the fulcrum member and the striker, and disposed to urge the striker yieldingly forward toward the support, and
  (f) a trigger mounted on the support and settable to hold the striker well to the rear of the pole carrier, leaving the pole carrier free to swing rearward away from the support under the weight of the pole and into light, non-tripping engagement with the trigger, while spaced a substantial distance from the striker, the construction and arrangement being such that the striker will be tripped by the pole carrier in response to a light tug upon the fishing line, and will, after picking up substantial speed and momentum, strike the pole carrier a percussive blow and snap it forward to jerk the line rearward with a yielding force, limited by the strength and strain of the spring to a magnitude which will generally avoid tearing the fish hook free.

2. A fishing pole mount as set forth in claim 1 in which the fulcrum member is a pivot pin affixed midway of its length to the support, and extends well beyond the lateral bounds of the pole carrier, and the spring is a wire spring comprising at its mid-portion a deformable loop of substantial length which extends around the front of the support in engagement therewith, two helical windings which surround portions of the pivot pin at opposite sides of the pole carrier and of the deformable loop, and end portions in the form of substantially parallel, radial arms having hooks formed near their free extremities for bearing against the rear face portions of the striker, the construction and arrangement being such that the spring loop can be deformed, within its elastic limit, sufficiently to permit one spring winding to be slid onto one end of the pivot pin and the other spring winding then to be slid onto the other end of the pivot pin, the spring being self-retaining in its assembled position, but capable of being readily removed and replaced manually without resort to any tool.

3. A fishing rod mount as set forth in claim 2 in which the fulcrum member extends well beyond the lateral bounds of the spring, and the striker is a bail composed of a single U-shaped length of heavy wire having parallel mounting loops at the free upper ends of its arm portions which embrace the spring and surround the ends of the pivot pin, the bail having sufficient resiliency to enable it to be applied to and removed from the pivot pin by temporarily spreading the bail arms, being self-retaining in assembled position, but being manually removable and replaceable without resort to any tool.

4. A fishing pole mount as set forth in claim 1 in which the support, at its upper end, at least, takes the form of an upstanding rod, the fulcrum member is a transverse pivot pin affixed midway of its length to the upper end of the support, the carrier at its upper end includes spaced curved ears which wrap halfway around the pivot pin at opposite sides of the rod, and the pole gripping means includes a clip held to the carrier by a bolt and nut combination applied to the carrier near the upper end thereof, the nut being so dimensioned and so located on the carrier that it engages the pivot pin in opposition to the open, curved ears of the carrier, confining the carrier against removal from the pivot pin.

5. A pole mount as set forth in claim 1 in which the length of the pole carrier, which extends below the fulcrum, is only a minor fraction of the length of the portion of a conventional pole, set in the carrier, which extends above the fulcrum, and the set position of the trigger is nearly tangent to the path of the trigger-engaging portion of the pole carrier, which is moved toward a tangent position in the course of the tripping of the trigger, so that the trigger is caused to oppose a very light and gradually diminishing resistance to the movement of the pole carrier, followed by a complete absence of resistance by the trigger to the movement of the pole carrier.

References Cited

UNITED STATES PATENTS

| | | |
|---|---|---|
| 1,400,253 | 12/1921 | Wicker. |
| 2,364,303 | 12/1944 | Martin. |
| 2,803,911 | 8/1957 | Hollingsworth _____ 43—15 |
| 3,170,262 | 2/1965 | Hall _____ 43—15 |

FOREIGN PATENTS 96,550    8/1939    Sweden.

SAMUEL KOREN, Primary Examiner

DANIEL J. LEACH, Assistant Examiner